United States Patent [19]

Martin

[11] Patent Number: 5,156,695

[45] Date of Patent: Oct. 20, 1992

[54] UNIVERSAL TIRE TRACTION APPARATUS

[76] Inventor: Don Martin, 7387 Pritchard Rd., Sacramento, Calif. 95828

[21] Appl. No.: 622,740

[22] Filed: Dec. 5, 1990

[51] Int. Cl.⁵ .................. B60C 27/20; B60C 27/04
[52] U.S. Cl. ................................ 152/216; 152/225 R
[58] Field of Search .......... 152/225 R, 225 C, 213 R, 152/216

[56] References Cited

U.S. PATENT DOCUMENTS

| | | |
|---|---|---|
| 2,598,851 | 6/1952 | Spevak . |
| 3,019,830 | 2/1962 | Shelby ............................. 152/225 R |
| 3,045,738 | 7/1962 | Lombardi . |
| 3,071,173 | 1/1963 | Hoffmann ......................... 152/216 |
| 3,117,612 | 1/1964 | Minutilla . |
| 3,120,256 | 2/1964 | Sekelsky ............................. 152/218 |
| 3,151,654 | 10/1964 | Minutilla . |
| 3,190,335 | 6/1965 | Isaacman ........................... 152/216 |
| 3,249,143 | 5/1966 | Scott . |
| 3,935,891 | 2/1976 | McCloud et al. . |
| 4,089,359 | 5/1978 | Jones . |
| 4,129,161 | 12/1978 | Quintana ......................... 152/225 R |
| 4,278,122 | 7/1981 | Vagias . |
| 4,306,604 | 12/1981 | Snider ......................... 152/225 R X |
| 4,386,643 | 6/1983 | Belknap, III et al. ............. 152/216 |
| 4,886,100 | 12/1989 | Parker, III . |

Primary Examiner—Michael W. Ball
Assistant Examiner—Adrienne C. Johnstone
Attorney, Agent, or Firm—John P. O'Banion

[57] ABSTRACT

A universal tire traction apparatus adapted to being mounted on the outer hub of the wheel of a vehicle generally comprising a plurality of cleat-like members extending transversely to the tread-wall portion of a tire while being supported by a brace assembly attached to an adapter plate mounted on the wheel. The cleat-like members are adapted to be slidably adjustable to fit a variety of wheel and tire sizes.

16 Claims, 2 Drawing Sheets

UNIVERSAL TIRE TRACTION APPARATUS

BACKGROUND OF THE INVENTION

1. Field of the Invention

This invention pertains generally to devices adapted to being mounted on the wheels of a vehicle to improve traction on slippery surfaces and, more particularly, to an apparatus which can be installed and removed without raising or moving the vehicle and which can easily be adjusted to fit a variety of sizes of vehicle wheels.

2. Description of the Background Art

Various devices have been developed for installation on the wheels of a vehicle to improve traction on slippery surfaces. For example, U.S. Pat. No. 3,249,143 issued to Scott on May 3, 1966 discloses a traction device for mounting on vehicle tires without jacking the vehicle. It comprises arms extending from the wheel axis and radially spaced around the tire. The portion of the arm which extends to the tire surface is offset to extend around the tire surface. The arms are adjustable to account for spacing differences. Once installed and the arms are extended, a cover plate is attached over the wheel hub to lock the arms into position.

U.S. Pat. No. 4,886,100 issued to Parker, III on Dec. 12, 1989 discloses an anti-skid device adapted to be mounted on vehicle tires comprising hooks which fit around the surface of the tire. The hooks are attached to arms which extend over the outside of the tire and which are held in place by a ring chain. In addition, the hooks can be fitted with cleats, studs and other devices to increase traction on snow and ice.

German Patent No. 2,262,011 issued to Gomez on Dec. 19, 1972 discloses a traction device for vehicle tires having cleats spaced radially along the surface of the tire and connected to arms which are connected to a centrifugal hub. The arms rotate in guides when the tire spins and tighten the cleats against the tire surface.

U.S. Pat. No. 3,935,891 issued to McCloud et al. on Feb. 3, 1976 discloses a traction device for vehicle tires which generally comprises a clamping device mounted on the tire and having a gripping surface on the outer periphery, an adapter plate to which the clamping device is attached, and an optional extension which adds traction surface to the device. The adapter plate is mounted on the wheel of the vehicle and a plurality of clamping devices are attached to the adapter plate, the same being evenly spaced around the tire. The clamping device can have various types of gripping surfaces ranging from cleated plates to studs.

U.S. Pat. No. 4,089,359 issued to Jones on May 16, 1978 discloses an assembly mounted on a vehicle tire which comprises a plurality of arms extending radially from the center of the tire to the outer surface, the ends of which have cleats which wrap around the surface of the tire. The arms to which the cleats are attached are telescoping for proper positioning.

U.S. Pat. No. 2,598,851 issued to Spevak on Jun. 3, 1952 discloses an emergency traction device which generally comprises a circular plate attached to the wheel of a vehicle and "L" shaped brackets which are in turn attached to the circular plate and extend over the surface of the tire.

U.S. Pat. No. 3,045,738 issued to Lombardi on Jul. 24, 1962 discloses a traction device which comprises a circular hub which attached to the wheel of a vehicle and which has "finger brackets" to which "L" shaped clamping brackets containing cleats are attached.

U.S. Pat. No. 3,151,654 issued to Minutilla on Oct. 6, 1964 discloses a traction devise comprising a plurality of radially disposed arms which are adjustable to the size of the tire so that they firmly grip the tire adjacent to the road surface but will expand as they leave the road surface.

U.S. Pat. No. 3,117,612 issued to Minutilla on Jan. 14, 1964 discloses a traction device which has radially spaced cleats which are locked and retained at high speeds by using centrifugal force to lock them in their guide channels.

U.S. Pat. No. 4,278,122 issued to Vagias on Jul. 14, 1981 discloses a traction device comprising a circular hub to which a plurality of traction fingers on supporting shanks are attached and which are equally spaced around the tire.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains to an apparatus adapted for installation on the outer hub of a wheel on a vehicle for improving traction on slippery surfaces, such as when the road surface is covered with mud, snow, or ice. Unlike conventional chains or snow tires, the apparatus can be installed and removed without having to move or raise the wheels of the vehicle, and can be easily adjusted to fit a variety of sizes of vehicle wheels.

By way of example and not of limitation, the apparatus generally comprises a plurality of rectangular traction members which are positioned at evenly spaced points around the tread portion of a tire. The traction members extend transversely across the tread-wall portion of the tire and contain cleat-like surfaces which face outwardly from the tire so as to contact the road surface. These cleats are attached to rectangular arms which are in turn attached to the outer hub of the wheel of the vehicle. Attachment of the support arms to the wheel is made by means of wheel lug extensions and an adapter plate. Once the apparatus is installed, the traction members are adjusted to fit the size of the wheel and tire by means of an adjusting sleeve.

Unlike the devices heretofore described, the present invention is universally adaptable to a variety of wheel and tire sizes. Furthermore, the present invention can be more easily removed and installed than the devices disclosed.

An object of the invention is to provide an apparatus which will improve traction of the tires of a vehicle when operating on slippery road surfaces.

Another object of the invention is to provide a tire traction apparatus which can be easily installed and removed from the wheel of the vehicle.

Still another object of the invention is to provide a tire traction apparatus which can be installed and removed from the wheel of a vehicle without having to raise the wheel.

Another object of the invention is to provide a tire traction apparatus which can be installed and removed from the wheel of the vehicle without having to move the vehicle.

Another object of the invention is to provide a tire traction apparatus which is universally adaptable to the wheels of a variety of vehicles.

Another object of the invention is to provide a tire traction apparatus which is unaffected by the thickness of the tire of the vehicle.

Still another object of the invention is to provide a tire traction apparatus in which slippage of the apparatus is of no detrimental consequence.

Still another object of the invention is to provide a tire traction apparatus which can be stored on a spare tire in a vehicle.

Still another object of the invention is to provide a tire traction apparatus with replaceable parts.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
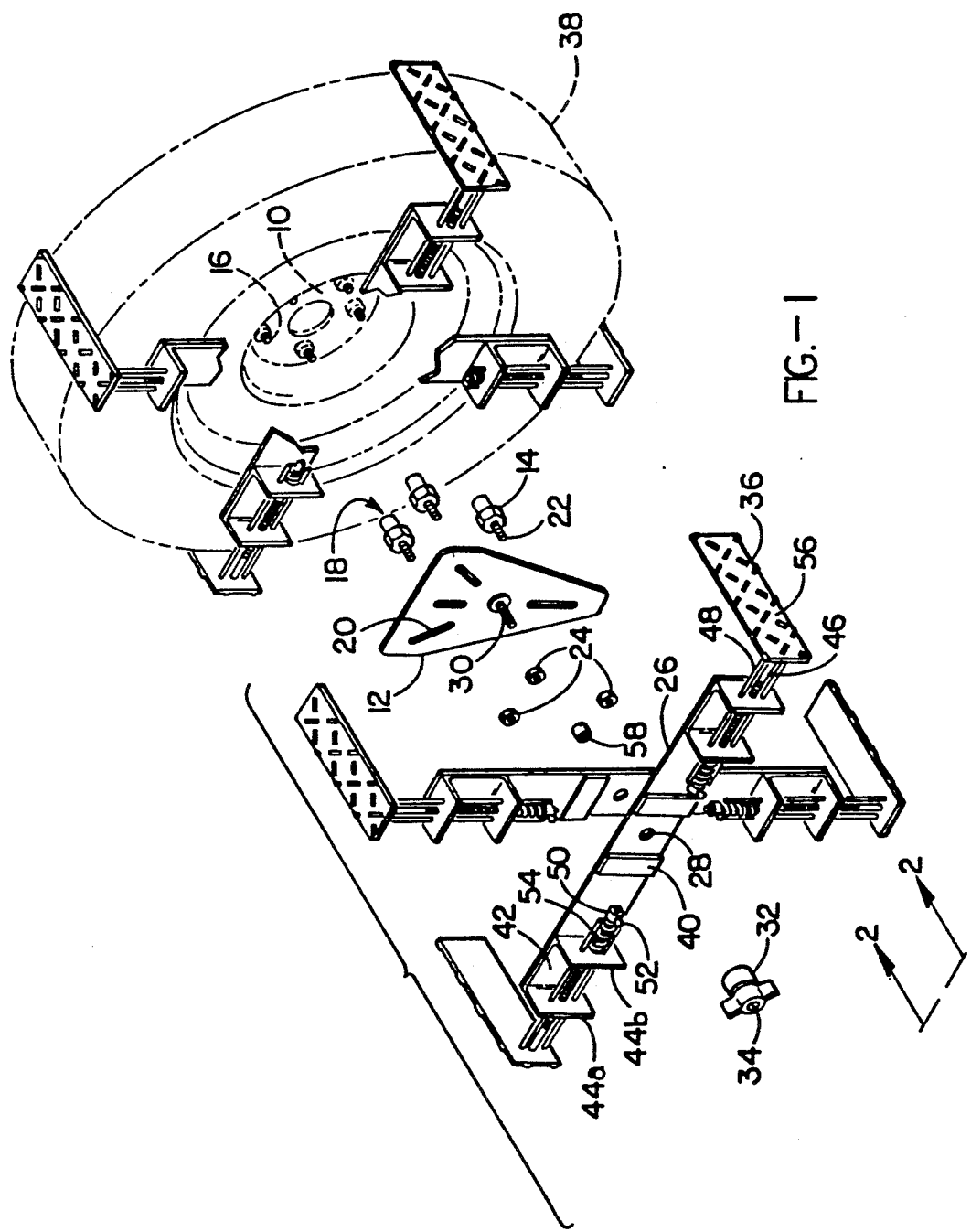
FIG 1 is an exploded view of the preferred embodiment of the present invention for use with the wheel and tire assembly shown in phantom.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

FIG. 1 shows the present invention and its use in combination with a vehicle wheel. Wheel 10 may be of conventional form and may include a metal support rim commonly used in vehicles. As schematically illustrated in the exploded view of FIG. 1, an adapter plate 12 is securely fastened to wheel 10 by first installing a plurality of lug extensions 14 on lugs 16 of wheel 10. Lug extension 14 includes a threaded receptacle 18, the threads of which mate with the threads on lug 16, so that lug extension 14 can be securely fastened to lug 16. Adapter plate 12 is secured to wheel 10 by placing openings 20 over the threaded end 22 of lug extensions 14 and fastening nut 24 on lug extension 14 to rigidly secure adapter plate 12 to wheel 10.

In the embodiment shown, three lug extensions 14 are used. In selecting the appropriate number to be used, the relative sizes of wheel 10 and adapter plate 12 are taken into consideration. It is desirable to have the weight and force components which are transmitted to adapter plate 12 to be distributed over a number of lugs 16. For most passenger type vehicles and light trucks, three lug extensions 14 are adequate.

Adapter plate 12 is a triangular shaped plate with openings 20 located therein as shown. By making openings 20 elongated and positioning them on adapter plate 12 as shown, adapter plate 12 becomes universally mountable to any size of wheel and any lug spacing or configuration commonly found in passenger type vehicles and light trucks. Note, however, that openings 20 can be otherwise positioned on adapter plate 12 as is desirable to fit wheel 10.

A plurality of support members 26 are securely fastened to adapter plate 12 by placing openings 28 over mounting post 30 on adapter plate 12. Mounting post 30 is a threaded stud which extends from adapter plate 12 in a direction which is substantially perpendicular to the face of adapter plate 12. Wing nut 32, which includes threaded barrel 34, is then fastened to mounting post 30 to rigidly secure support members 26 to adapter plate 12. Note that threaded barrel 34 extends completely through wing nut 32 so that the length of mounting post 30 is not critical.

Support member 26 is elongated and rectangular in shape as shown. The preferred mounting configuration is to join two support members 26 at or near their centers by fitting openings 28 over mounting post 30. It is also preferred to position support members 26 at right angles to each other, thus forming a right angular cross as shown. This is done by positioning support members 26 such that the longitudinal axis between each end of a first support member 26 is substantially perpendicular to the longitudinal axis between each end of a second support member 26. By doing so, traction members 36 will be evenly spaced around tire 38 thereby providing uniform traction.

In order to facilitate positioning support members 26 in this configuration, a plurality of guides 40 are attached to support member 26 as shown. Typically, guides 40 are rectangular or square metal tabs placed on each side of opening 28 to form a channel roughly equivalent in width to the width of support member 26. Where support member 26 is made from metal, which is preferred, guides 40 can be welded or otherwise rigidly fastened to support member 26. Alternatively, guides 40 can be formed as an integral part of support member 26 when a casting process is used. Support member 26 may typically be fashioned from one-quarter inch thick metal.

Positioned at each end of support member 26 is brace 42 as shown. Brace 42 is a "U-shaped" channel including lips 44a, 44b as its side walls. Lip 44a of brace 42 is located at the end of support member 26 in a direction substantially perpendicular to the face of support member 26. Brace 42 may be made from metal and welded or otherwise rigidly fastened to support member 26, or casted as an integral part of support member 26.

Figure 2:
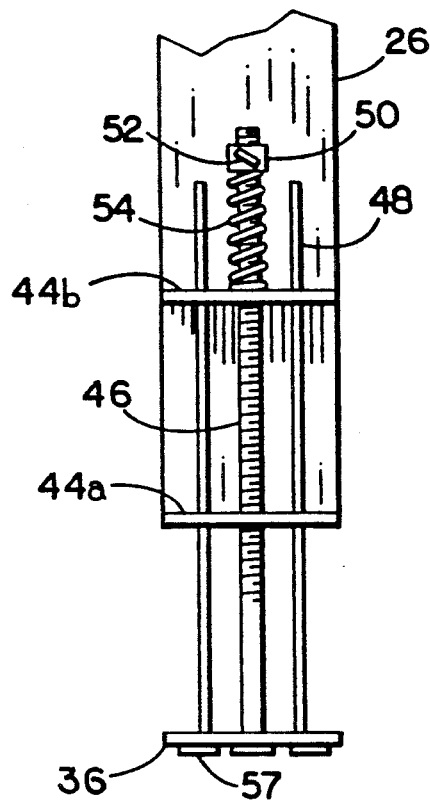
FIG. 2 is a side elevational view of one of the traction members of the apparatus depicted in FIG. 1.

Referring now to FIG. 1 and FIG. 2 together, traction member 36 is attached to support member 26 by means of an elongated shank 46 which extends through holes in lips 44a, 44b of brace 42. Shank 46 may be cylindrical or rectangular without affecting operation, but must is preferably cylindrical and three-eights of an inch in diameter. Shank 46 must also slidably engage lips 44a, 44b so that it can be adjusted into the desired position. Shank 46 extends from and is perpendicular to one face of traction member 36, and can be welded to or otherwise attached to traction member 36. Providing stability and preventing rotational movement of traction member 36 are elongated support shafts 48 which are similarly attached to traction member 36 and extend through holes in lips 44a, 44b. Support shafts 48 may also be cylindrical or rectangular in shape so long as they slidably engage lips 44a, 44b and can be moved freely.

Figure 3:
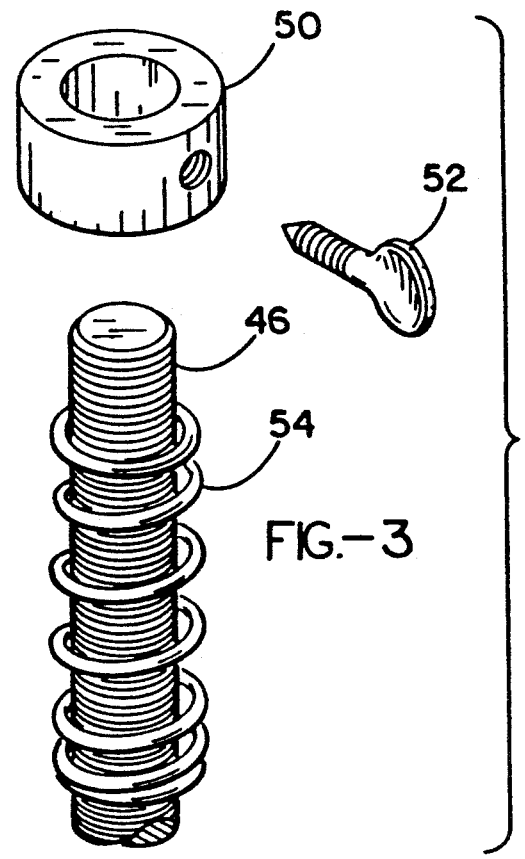
FIG. 3 is an exploded view of the locking sleeve mechanism used to fix the position of the traction members of the apparatus depicted in FIG. 1.
Figure 4:
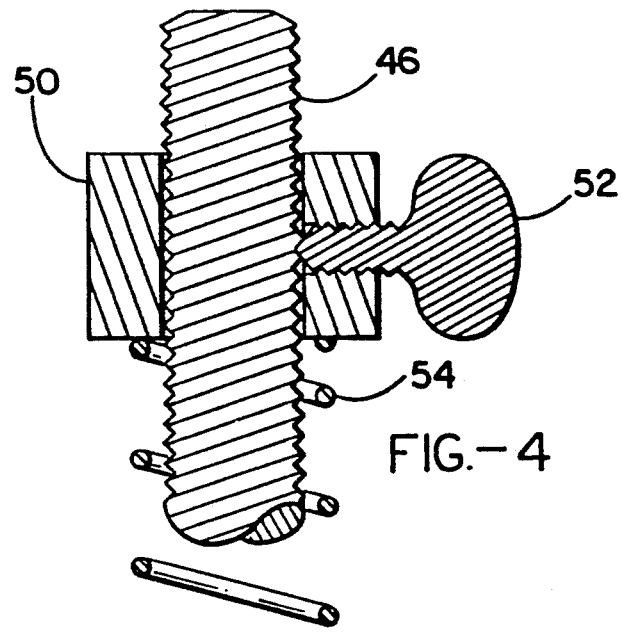
FIG. 4 is a cross-sectional view of the locking sleeve mechanism shown in FIG. 3.

Referring more specifically to FIG. 3 and FIG. 4, to lock traction member 36 into position sleeve 50 is placed over the end of shank 46 which is toward the center of support member 26. Lock bolt 52 is threaded into a hole in sleeve 50 which has been drilled and tapped to accept lock bolt 52. One end of lock bolt 52 is tabbed for manual rotation whereas the other end is pointed and can be tightened up against shank 46. In the preferred embodiment shank 46 is threaded so that the pointed end of lock bolt 52 can engage the threads in shank 46 as shown in FIG. 4.

Adjustment of the position of traction member 36 is straightforward. The user slides traction member 36 in a direction toward the center of wheel 10 until the back face of traction member 36 rests against the tread-wall portion of tire 38. Sleeve 50 is then adjusted to a position which slightly compresses spring 54 which is threaded onto shank 46 between lip 44 and sleeve 50. Spring 54 provides automatic fine adjustment of traction member 36 by retracting traction member 36 toward the center of wheel 10. For quick removal of the apparatus, the user can also pull traction member 36 away from tire 38 because of the spring action and remove the apparatus without having to completely remove traction member 36 or readjust sleeve 50. Quick installation is also facilitated in a similar manner.

It is important to note that traction member 36 is typically elongated and rectangular in shape as shown in FIG. 1. In this manner, the width of tire 38 does not require re-sizing of the apparatus as would be required if traction members fit around and over the entire tread-wall portion of tire 38. Traction member 36 extends longitudinally over sufficient surface area of the tread-wall portion of tire 38 so as to permit relatively complete coverage across the tread-wall portion of tire 38. Additionally, traction member 36 has a frictional surface 56 so as to engage the road surface and provide additional traction. Frictional surface 56 may be formed in any manner which provides less than smooth engagement of the road surface. In the preferred embodiment, traction member 36 contains cleats 57 to form frictional surface 56.

In operation, slippage of traction members 36 around the surface of tire 38 after engaging the road surface would has no detrimental effect because traction member 36 would still engage the road surface at some point. Instead, such slippage would tend to increase frequency with which traction members 36 actually engage the road surface. Therefore, as an alternative embodiment, bushing 58 could be installed over mounting post 30 and inside of hole 28 as shown in FIG. 1. By using a sealed rotating bushing, bushing 58 would permit rotation of support members 26 around mounting post 30 instead of rigidly attaching support members 26 to adapter plate 12. In this manner, after traction member 36 engages the road surface, the centrifugal force from rotation would pull on spring 54, moving traction member 36 away from the tread-wall portion of tire 38, and thus permitting support member 26 to rotate until another traction member 36 contacts the road surface.

Accordingly, it will be seen that this invention provides a universal tire traction apparatus which can be used to improve the traction of vehicles while operating on slippery surfaces. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A universal tire traction apparatus, comprising:
   (a) a first and second elongated support member, each said elongated support member having a first end and a second end, each end of said elongated support members including a traction member slidably coupled thereto, each said traction member having a frictional surface;
   (b) means for coupling said elongated support members near their centers;
   (c) means for positioning each said elongated support member so that the axis running longitudinally between said first end and said second end of said first elongated support member is substantially perpendicular to the axis running longitudinally between said first end and said second end of said second elongated support member;
   (d) means for fixing the position of each said traction member in relation to the treated-wall of a vehicle tire;
   (e) an adapter plate;
   (f) means for coupling said adapter plate to each said elongated support member; and
   (g) means for attaching said adapter plate to the wheel lugs of a vehicle.

2. The apparatus as recited in claim 1, wherein said said traction members are elongated.

3. The apparatus as recited in claim 1, wherein said means for coupling said adapter plate to said elongated support members comprises a threaded stud, said threaded stud being fixedly attached to said adapter plate, said threaded stud extending through holes near the centers of said elongated support members, said threaded stud including a nut.

4. The apparatus as recited in claim 1, wherein each said traction member includes an elongated shank, said elongated shank being fixedly attached to said traction member at one end of said elongated shank, the other end of said elongated shank extending through a hole in said elongated support member to which said traction member is coupled.

5. The apparatus as recited in claim 4, wherein said means for fixing the position of each said traction member in relation to the tread-wall of a vehicle tire comprises a sleeve, said sleeve being positioned over said elongated shank, said sleeve having a removable screw means for fixedly coupling said sleeve to said elongated shank.

6. The apparatus as recited in claim 1, wherein said means for attaching said adapter plate to the wheel lugs of a vehicle comprises a plurality of lug extensions, said lug extensions being removably attachable to said wheel lugs, said lug extensions being removably attachable to said adapter plate.

7. The apparatus as recited in claim 1, wherein said end of each said elongated support member includes a lip, said lip being substantially perpendicular to said elongated support member.

8. The apparatus as recited in claim 7, wherein each said traction member includes an elongated shank, said elongated shank being fixedly attached to said traction member at one end of said elongated shank, the other end of said elongated shank extending through a hole in said lip.

9. The apparatus as recited in claim 8, wherein said means for fixing the position of said traction member in relation to the tread-wall of a vehicle tire comprises a sleeve, said sleeve being positioned over said elongated shank, said sleeve having a removable screw means for fixedly coupling said sleeve to said elongated shank.

10. The apparatus as recited in claim 9, further including a spring, said spring being positioned over said elongated shank between said sleeve and said lip.

11. The apparatus as recited in claim 10, wherein said means for coupling said adapter plate to said elongated support members comprises a threaded stud, said threaded stud extending through holes near the centers of said elongated support members, said threaded stud including a nut.

12. An apparatus for attachment to a vehicle wheel and tire assembly for improving traction of a vehicle operating on slippery surfaces, comprising:
    (a) an adapter plate;
    (b) means for attaching said adapter plate to the wheel lugs of a vehicle;
    (c) a first and second elongated arm, each said elongated arm having a first end and a second end, each said end including a lip substantially perpendicular to said elongated arm, each said end including an elongated traction member slidably coupled thereto, each said traction member having a frictional surface;
    (d) means for coupling said elongated arms near their centers such that the axis running longitudinally between said first end and said second end of said first elongated arm is substantially perpendicular to the axis running longitudinally between said first end and said second end of said second elongated arm; and
    (e) means for fixing the position of each said elongated traction member in relation to said elongated arm to which said traction member is coupled.

13. The apparatus as recited in claim 12, wherein each said elongated traction member includes an elongated shank, said elongated shank being fixedly attached to said elongated traction member at one end of said elongated shank, the other end of said elongated shank extending through a hole in said lip.

14. The apparatus as recited in claim 13, wherein said means for fixing the position of said elongated traction member in relation to said support member comprises a sleeve, said sleeve being positioned over said elongated shank, said sleeve including a removable screw means for fixedly coupling said sleeve to said elongated shank, and a spring, said spring positioned over said elongated shank between said sleeve and said lip.

15. The apparatus as recited in claim 14, wherein said means for attaching said adapter plate to the wheel lugs of a vehicle comprises a plurality of lug extensions, said lug extensions being removably attachable to said wheel lugs, said lug extensions being removably attachable to said adapter plate.

16. A tire traction device, comprising:
    (a) a first elongated arm, said first elongated arm having a first end and a second end, each said end having a lip substantially perpendicular to said first elongated arm;
    (b) a second elongated arm, said second elongated arm having a first end and a second end, each said end having a lip substantially perpendicular to said second elongated arm;
    (c) means for coupling said first elongated arm to said second elongated arm near the center of each said elongated arm;
    (d) means for positioning each said elongated arm so that the axis running longitudinally between said first end and said second end of said first elongated arm is substantially perpendicular to the axis running longitudinally between said first end and said second end of said second elongated arm;
    (e) a plurality of elongated traction members, each said elongated traction member having a frictional surface, each said elongated traction member having an elongated shank, said elongated shank being fixedly attached to said elongated traction member at one end of said shank, the other end of said elongated shank extending through a hole in said lip, one of each said elongated traction members coupled to each end of said elongated arms;
    (f) a sleeve, said sleeve being positioned over said elongated shank, said sleeve having a removable screw means for fixedly coupling said sleeve to said elongated shank;
    (g) a spring, said spring being positioned over said elongated shank between said sleeve and said lip;
    (h) an adapter plate;
    (i) a threaded stud, said threaded stud being fixedly attached to said adapter plate, said threaded stud extending through holes near the center of said elongated arms, said threaded stud including a nut;
    (j) a plurality lug extensions, said lug extensions being removably attachable to the lugs of a vehicle wheel, said lug extensions being removably attachable to said adapter plate.

* * * * *